June 7, 1966 — P. E. J. M. MALDAGUE — 3,255,087
NUCLEAR REACTOR CONTROL SYSTEM
Filed Feb. 21, 1962
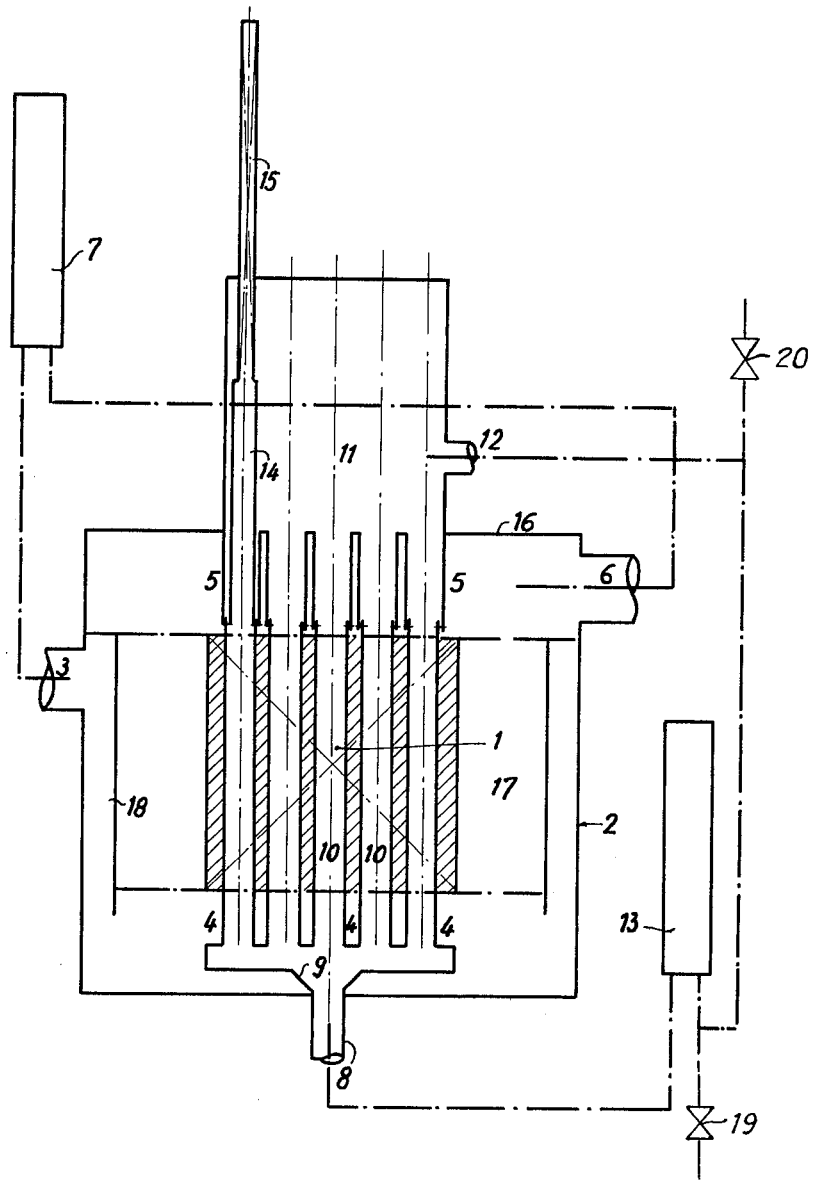

3,255,087
NUCLEAR REACTOR CONTROL SYSTEM
Pierre Edmond Jules Marie Maldague, Brussels, Belgium, assignor, by mesne assignments, to Societe Anglo-Belge Vulcain, Société Anonyme, Brussels, Belgium
Filed Feb. 21, 1962, Ser. No. 178,523
Claims priority, application Belgium, Feb. 28, 1961, 600,717
6 Claims. (Cl. 176—42)

This invention relates to a nuclear reactor in which the moderator and the coolant are distinct from one another, either by their nature, or because they flow through circuits which are substantially separated inside the core of the reactor.

In the description which follows, the expression "moderator" should be understood as excluding the coolant and in a broad meaning; that is it applies not only to the material the main function of which is the slowing down of the speed of the neutrons inside the core itself; but also to the material for slowing down used as a reflector of the neutrons which leave the core. The expression "coolant" should also be understood in a broad meaning: it designates a fluid the main function of which is to absorb the heat produced by the core, even when the said fluid possesses moderating properties.

The invention relates more particularly to a nuclear reactor with liquid moderator, in which part or the whole of the latter flows in a circuit which is substantially distinct inside the core from that of the coolant.

The invention applies to reactors the core of which is divided into two or several zones, each zone being cooled by a cooling fluid which may be distinct from that acting upon other zones.

The effects of the variation of the moderation in a nuclear reactor have been known for a long time. Indeed, from its origin, the calculation of the nuclear reactions has always taken into account the said variation under the combined effects of the temperature, of the density and of the composition of the moderator on the one side, and of the modifications of the geometry of the core under the various conditions of working of the reactor on the other side. Concerning more particularly the effect of the composition of the moderator, reference should be made to the example mentioned by Iskenderian in 1955 in his publication entitled "Heavy Water Reactors for Industrial Power Including Boiling Reactors," showing the effects of the systematic introduction of light water into the heavy water which is used as moderator, and showing namely that such introduction allows, in certain cases, of reducing the critical mass of fissile material or, in other words, of increasing the reactivity for one and the same mass of fissile material.

For reactors in which the moderator is distinct from the coolant, either because it is of a different nature, or because it is a fluid flowing through a separate circuit, the effect of the variation of the temperature, of the density and/or of the composition of the moderator may be utilized for the regulation, at least in part, of the reactivity of the core.

Various known reactors of this type utilize the effect of the variation of the temperature and of the density of the moderator for regulating the reactivity. Such a mode of regulation is mentioned in the 1955 edition of the "Reactor Handbook," and it is used for example in the Canadian Reactors N.R.X. and N.P.D.

However, such known reactors do not allow of reaching a high burnup of the nuclear fuel by the sole effect of the variation of the temperature and of the density of the moderator, because such an effect allows a limited margin of regulation only.

In another known reactor, in which use is made of the variable moderating properties of a fluid mixture used at the same time as the moderator and as the coolant, a very considerable margin of reactivity is ensured by the continuous variation in one direction or another of the composition of the moderating mixture, and more particularly of its contents of light water.

With a view, on the one side, of maintaining the criticality according as the fissile material is consumed and, on the other side, of compensating variations of reactivity such as those due to the production of xenon, the regulation of such known reactor is effected by acting in a continuous manner upon the composition of the moderating mixture and more particularly upon the ratio (heavy water:light water), in other words by introducing into the moderator in this latter case either heavy water, or light water according to the effect desired.

In such a reactor, it is not possible to take advantage of the effects of the temperature and of the density of the moderator, since the latter is identical with the coolant, the temperature and density of which should remain substantially constant during normal operation. On the other hand, it is not possible to use any type whatever of coolant since the coolant being also the moderator, should have a variable composition and moderating properties. Moreover, the regulating device used in such a reactor has the drawback of requiring a permanent plant incorporated thereto, for ensuring a variation of the composition of the moderating mixture and more particularly a separation of the heavy water from the light water which must necessarily be re-introduced into the regulating circuit. It also has the drawback of requiring in this case a permanent provision of an additional stock of heavy water. Two separate circuits flow through the reactor according to the present invention, that of the coolant, called "primary circuit" hereinafter, and that of the regulation.

The present invention consists in a nuclear reactor in which the moderator and the coolant are distinct from one another in part or wholly, either by their nature, or because they flow through substantially separate circuits, at least inside the core, which reactor is characterized in that the composition and/or the temperature of part or of the whole of the moderator can be both modified independently of the composition and of the temperature of the coolant.

The primary circuit may be of any known type. The cooling fluid may be a liquid under pressure or in a boiling state, a wet vapour, saturated or superheated, or a gas. It may possess moderating properties or not. The primary circuit may have a natural flow, or it may comprise one or several apparatus of forced flow (pump, fan, blower, or compressor). The heat transmitted to the cooling fluid inside the core may be utilized either through the intermediary of a heat-exchanger transmitting the useful heat to a secondary working fluid (liquid, vapour or gas), or direct in the form of vapour or primary gas.

Through the circuit of regulation either the moderator itself may pass, or a fluid of an identical nature or of a different nature from that of the coolant and/or of the moderator if fluid. Such circuit may be open or not and may comprise one or several heat exchangers or not. The flow may be natural or forced.

Inside the vessel, the coolant flows along the assemblies of fuel elements, which may be of any known type, the material of which in contact with the coolant is compatible with the latter. When the regulating fluid is the moderator itself, that part of the regulating fluid which is situated inside the tank is limited to one or several inlet pipes and to one or several outlet pipes, giving access to the chamber or chambers occupied by part or by the whole of the moderator, separated from the circuit of the coolant inside the vessel by means of walls which may be provided with a heat insulation, of any known type compatible with the fluid which bathes it. When the regulating fluid is not the moderator itself, the regulating circuit runs in the vessel through the enclosure reserved to a part or to the whole of the moderator, through channels provided in the moderator when the latter is solid, or in heat-exchanging tubes, when the moderator is fluid. The channels or tubes may be coated with a material compatible with the regulating fluid and/ or with the moderator.

Any pressures of the coolant, of the moderator and/or eventually of the regulating fluid may be used, and they may be different from each other, however the use of identical pressures or of pressures very near to each other, allows of reducing the thickness of the separating walls to a minimum.

The enrichment in fissile material of the fresh fuel elements (U–235, U–233, Pu–239, Pu–241) and the geometry of the core are chosen so that the excess of initial reactivity which the core would have, if it were normally moderated, shall be sufficient to allow the burn-up required, which will be obtained by progressively improving the moderation.

When the fuel elements are fresh, a reactor according to the present invention uses a first moderator of a composition such that when it has its maximum temperature $T_1$ of normal operation, the reactor is just critical during operation at full power, all shutoff rods and possibly the control rods being out, without the poisoning effect by xenon having begun to be felt. When cold, this reactor with a new core thus defined is maintained sub-critical by means of shutoff rods of any known type, advantageously arranged in the chamber or chambers occupied by the moderator. When the shutoff rods are pushed in, the reactor may be brought to its temperature of normal working and the moderator, wholly or in part, to a temperature $T_1'$, which may be higher than $T_1$, and this is done by one or several heating means of any known type acting upon the primary circuit and/or upon the regulating circuit. When the reactor has reached the temperature of normal operation, the shutoff rods are progressively raised till the critical point is reached, and this can be obtained under the conditions above defined, only when all the rods are entirely brought out from the enclosure occupied by the core and its reflector.

In order that the raising to power may be produced, it is necessary to compensate the variation of reactivity due to the Doppler effect, and this is done by lowering the temperature of part or of the whole of the moderator from $T_1'$ to $T_1$, for instance. As a modification, it is possible to provide the use of one of the shutoff rods as a rod for the control of the power output. Thus, the reactor is caused to operate in such a manner that the moderator temperature is retained within a band defined by predetermined upper and lower temperature limits.

In the latter case, an excess of rise of temperature of part or of the whole of the moderator during the preliminary heating, is not to be taken into account, and the increase of power is effected by raising the control rod of the power output. The full power is then reached when this rod has been fully raised.

When the reactor works at full power, the lowering of the reactivity corresponding to the progressive poisoning by xenon is compensated by a progressive lowering of the temperature of part or of the whole of the moderator, and this is obtained by means of the regulating circuit.

When the burnup proceeds, the temperature at normal working of part or the whole of the moderator is lowered until the lower limit $T_2$ of normal working has been reached. During the first stage of the life of the core it is clear that the effects upon the reactivity of the lowering of power and of the suppression of poisoning due to xenon, may be compensated by variations of the temperature of part or the whole of the moderator in an opposite direction to those above described, and in the modification with a rod control for the power, by pushing the latter into the core through a greater or less amount.

At the end of the first stage of the life of the core, a modification of the composition of part or the whole of the moderator is proceeded with, the new composition being chosen in such a manner that the reactor shall again be critical when hot, when the moderator is in part or wholly at a temperature of normal operation higher than $T_2$ and which may again be $T_1$ for instance.

Such a modification may be effected by removal or withdrawal of the initial moderator and its replacement by the new moderator. It may also be effected by dilution, for example by addition of light water to the initial moderator when the latter is composed in part or wholly of a mixture consisting of light water and heavy water.

The working of the reactor during the second stage of the life of the core is identical with that described for the first stage; more particularly, the second stage is ended when the temperature of the moderator reaches in normal working its lower limit value $T_2$.

A new change is then made, as already mentioned, in the composition of the moderator and a new stage of the life of the core is commenced.

The above mentioned processes are repeated until the optimum moderation has been reached, which marks at the same time the end of the useful life of the core. The latter is then replaced wholly or in part by new assemblies of fuel elements and the operations previously described may again be commenced.

When necessary, the arrangement of the core elements is such that the ratio of the volumes respectively occupied inside the actual core by the materials having moderating properties, held substantially at the temperature of the coolant, and by the fraction of the moderator the temperature of which is adjustable, is comprised between a lower limit below which the coefficient of reactivity of the core as a function of the temperature of the coolant would become positive, and an upper limit beyond which the margin of reactivity which may be controlled by the sole variation of the temperature of the moderator would become insufficient to allow a normal operation of the reactor taking place.

The indications given above describe the reactor according to the invention in its most general form.

With a view to making the invention clearer, and to pointing out its advantages, a particular mode of carrying the invention into effect is described hereinafter by way of example.

Such a mode of carrying the invention into effect relates to the case where both the moderator and the coolant consist of the same predetermined mixture of heavy water and light water, the composition of the mixture being modified by stages as hereinafter described, by lowering the contents of heavy water.

In such particular mode of carrying out, the moderator and the coolant are separated inside the core by means of conduits, which are component parts of chambers of circular cross-section for instance, provided with a heat insulation in such a manner as to limit the heat exchange between a portion of the moderator at a variable temperature and the surroundings, to a minimum.

Such conduits may form a nest of any known type, and namely of the various types considered in the technique of tube reactors.

The elements of nuclear fuel consist of assemblies of any known type. Such assemblies may be arranged inside the above said conduits, as is well known in the technique of tube reactors. As a modification, they may be arranged outside the above said conduits, in which case the portion at variable temperature of the moderator is itself arranged inside the above said conduits.

One particular form of the invention is diagrammatically shown in the accompanying drawing, by way of illustration, not limitation.

The cooling fluid enters a vessel 2 through one or several pipes 3, flows downwards along the walls of the vessel 2 and is distributed in a horizontal direction into a space 4. It is heated during its upwards movement between the fuel elements which surround conduits 10 containing the moderator, the whole arrangement forming the core 1. The cooling fluid is collected into the space 5 and leaves the vessel through one or several pipings 6.

The cooling fluid may yield the heat which it withdraws from the core 1 to any other fluid, for instance inside a heat exchanger 7.

It is obvious that the cooling fluid may follow a different route from that diagrammatically shown in FIGURE 1. It may for instance enter at 6 and leave out at 3, move in one direction and back inside the core, yield the heat which it carries inside apparatus other than the exchanger 7.

In the particular mode of carrying the invention into effect which is shown in FIGURE 1, the moderating fluid at the desired temperature and of suitable composition follows a circuit which is entirely independent from that of the coolant.

It enters the vessel through a pipe 8, is distributed inside a distributor 9, and rises inside the chambers 10 arranged inside the core.

The moderating fluid which is heated by its passage inside the core, is collected at 11 and is led through a piping 12 into an apparatus 13 (for instance, a heat-exchanger) which brings it to the required temperature.

As in the case of the cooling fluid, the moderating fluid may flow in a downward direction inside the core, instead of flowing in an upward direction, or also along simple or multiple paths in one direction and backwards; the chambers in the core which contain the moderator may be fed in series or in parallel, and the inlets and the outlets may be arranged on each side or on one and the same side of the core.

The drawing illustrates diagrammatically by way of example and not limitation several arrangements relating to the complete assembly of the vessel. It has been diagrammatically shown therein:

A shutoff rod 14;
A driving mechanism 15 for the shutoff rod 14;
A cover 16 of the vessel;
A portion 4 of the reflector 17;
A thermal shield 18.

In order to limit the exchange of heat between the fluids at different temperatures, a suitable heat insulation of the entire circuit at a variable temperature inside the vessel is provided. The insulation may be formed in any known manner which is compatible with the requirements of each of its parts. Inside the core, the materials used will be for instance as poor neutron absorber as possible. It is namely possible to utilize for the heat insulation the known principle of chambers with stationary water, carried out by means of thin sheets of zircaloy. At other points, it is possible to use more suitable and less expensive processes, more particularly where the requirements from the point of view of nuclear characteristics of the core are less limitative.

In all embodiments of reactors constructed according to the invention, the vessel of the reactor is associated with an outer circiut of utilization of a type generally known, as well as with a regulation circuit. The latter, in the particular mode of carrying out corresponding to the example above described, utilizes as the working fluid the moderator itself, formed by a mixture of heavy water and light water and the composition of which is modified by stages as above described, for example, simply by acting upon two valves 19 and 20, one introducing light water, the other ensuring the removal of an equivalent amount of the initial mixture.

The temperature of the moderator contained in the chambers may be regulated by any known means.

In all the forms of operating a reactor according to the invention, the upper limit $T_1$ and the lower limit $T_2$ of the temperature of the moderator are chosen sufficiently apart from each other, to be compatible with the nature and the properties of the moderator and with the source of cooling which is available, in order to have a sufficient margin of reactivity and thus to allow a working of the reactor as described above. It may however be economical to fix the lower limit $T_2$ to a value sufficiently high in order to allow a practical utilization of the heat absorbed by the moderator inside the core.

As to the upper limit $T_1$, it will generally be chosen as high as possible. It is thus understood that in the case of utilization of a regulating fluid or of a moderator in a liquid state, it becomes possible to fix as the value of $T_1$, a temperature equal to, or near the temperature of saturation at the pressure of normal operation.

The fact that the circuits of the coolant and of regulation are substantially distinct from each other, allows the use of different fluids for the two functions. It is however possible, without leaving the scope of the present invention, to make use of fluids which are substantially identical for the two circuits and to vary the composition of the latter in the same manner during the different stages of the life of the core. In this case, one and the same fluid flows inside the core substantially through separate circuits at different temperatures.

The general characteristics of a reactor of 65 mwt. carried out according to the particular form of invention illustrated diagrammatically in the drawing are given hereinafter in order better to appreciate the advantages of the latter:

| | |
|---|---|
| Thermal power mw. | 65. |
| Type of fuel | $UO_2$. |
| Total weight of $UO_2$ in kgs. | 1420. |
| Outer diameter of fuel elements including cladding | 8.5 mm. |
| Nature of the cladding | Stainless steel. |
| Nature of fuel | Enriched U. |
| Average initial enrichment in U-235 | 7%. |
| Nature of moderator and of coolant | A mixture $D_2O$—$H_2O$. |
| Ratio $\dfrac{\text{volume of coolant}}{\text{volume of } UO_2}$ inside the core | 1.41. |
| Ratio $\dfrac{\text{volume of moderator}}{\text{volume of } UO_2}$ inside the core | 2.77. |
| Ratio $\dfrac{\text{volume of coolant} + \text{vol. Mod.}}{\text{volume } UO_2}$ inside the core | 4.18. |
| Thickness of the radial reflector | 0.300 m. |
| Thickness of the axial reflector | 0.300 m. |
| Active height of the core | 1 m. |
| Active average diameter of the core | 1 m. |
| Maximum ratio $\dfrac{\text{max. therm. flux.}}{\text{average flux}}$ during the life of core | 2. |
| Pressure of the coolant during normal operation | 150 kgs./cm.$^2$. |
| Pressure of the moderator during normal operation | 150 kgs./cm.$^2$. |
| Maximum temperature of the moderator at normal operation | 300° C. |
| Minimum temperature of the moderator at normal operation | 180° C. |

| | |
|---|---|
| Average temperature of the coolant at normal operation | 300° C. |
| Inlet temperature of the coolant at normal operation | 290° C. |
| Outlet temperature of coolant at normal operation | 310° C. |
| Initial composition of the moderator | 92% $D_2O$/8% $H_2O$. |
| Final composition of the moderator | 49% $D_2O$/51% $H_2O$. |
| Average burnup obtainable | 45,000 mwj./t. |
| Final percentage of fissile Pu (239+241) | 1.00%. |
| Final percentage of $U_{235}$ | 2.8%. |
| Thermal power per litre of core | 83.0 kw./lit. |
| Thermal power per kg. of $UO_2$ | 45.7 kw./kg. |
| Thermal power per kg. of U | 52 kw./kg. |

This example is given only as a non-limitative example and numerous modifications within the scope of the present invention may be deducted therefrom. It is for instance possible to remove the whole or part of the heat produced by the core by utilizing boiling water instead of water under pressure, this water being a mixture of heavy water and light water. It is also possible to use wet steam or superheated steam of ordinary water, at the pressure of 150 kg./cm.$^2$ or at a different pressure, or even an organic coolant such as terphenyl.

As a modification, it is possible to use fuel elements of carbide of uranium slightly enriched, clad with non-porous graphite, the coolant being then a gas ($CO_2$ or He) under high pressure, for instance 150 kgs./cm.$^2$, and the moderator being a mixture of heavy water and light water.

Another modification consists in using fuel elements of UC-graphite, a gas under high pressure as the coolant, a solid moderator containing as main element for instance graphite and/or beryllium, and/or hydride of zirconium, and a circuit of regulation through which flows a gas under high pressure.

The various examples, non limitative of the scope of the invention, show the flexibility of conception of the reactor carried out according to the invention and its facility of adaptation to all the technical modifications of its component parts: fuel elements, coolant, moderater, etc.

All the modes of carrying the reactor according to the invention into effect comprise the characteristic features above enumerated involving the following essential advantages:

A very high increase of the burnup, which can practically be carried out owing to the considerable increase of the margins of reactivity which are available for compensating the said burnups;

An excellent neutronic economy at full power and excellent factor of distribution of the thermal power inside the core, which in practice implies very advantageous costs of the fuel cycle, by a high specific power, as well per kg. of special nuclear material (uranium-$D_2O$, etc.) as per litre of volume of the actual core, by a reduction of the costs of the installations of the actual primary circuit and by an appreciable increase of the thermodynamic efficiency which may be obtained in the power circuit;

A possibility of using a wide variety of materials, in a separate manner for the nuclear fuel, for the moderation and for the cooling of the core, and of choosing the assortment of these materials which allows of obtaining better technical and economical characteristics of the reactor;

A reduction to a strict minimum of the amount of moderator which is tied up, which is important from the economical point of view when the moderator contains an expensive material such as for instance heavy water, beryllium or its oxide, or hydride of zirconium;

A great simplicity of the means required for regulating the reactivity within the very wide range of potential variation of the latter between the partial or complete reloadings of the core. These means are limited, as seen above, to a continuous control of the temperature of the regulation circuit, and to a discontinuous modification, at periodic intervals, of the composition of the moderator. The means may be reduced in the most favourable case, for instance to two manual actuating valves, one regulating the primary or secondary output in the regulation circuit, the other permitting the inlet of ordinary water into the moderator to take place at regular intervals when the moderator consists of a mixture of heavy water and light water. These means may therefore be space saving, of small cost and very reliable. They may be rendered automatic at little cost. All these characteristic features are essential from the technical and economical point of view to power reactors, and more particularly to reactors used for ship propulsion;

Simplicity and reliability of the means required for safety shutdown. These means may consist for instance of absorbing rods, not provided with an extension, which should not be integral with the assemblies of fuel elements, and may be light, whence a reduction of the cost and of the space taken by the actuating mechanisms of these rods. On the other hand, as these rods are immersed into the moderator and not in the coolant in the case of a safety shutdown, they do not risk of giving a positive value to the coefficient of reactivity of the core as a function of the temperature of the coolant; their use means therefore a great intrinsic safety.

The above mentioned advantages allow reactors built according to the invention, even when they are situated within the range of small and medium power, to produce energy at a cost lower than that of known apparatus and at a price which is competitive with that of the classic means of energy production. They find more particularly their use for nuclear propulsion of merchant ships for the reasons above explained, and also owing to their compactness and facility of handling.

What I claim is:

1. In a nuclear reactor containing a moderator which is at least partly liquid, the temperature and the composition of which are each adapted to be varied substantially when the reactor is normally operating under power, said temperature being adapted to be varied within a band defined by upper and lower temperature limits, substantially apart from each other, a method of controlling said reactor comprising the steps of: (1) substantially varying the temperature of the moderator and (2) varying the composition of the moderator to retain said temperature within said band.

2. A method in accordance with claim 1 wherein the moderator is comprised of heavy water and light water and the composition of the moderator is varied by varying the relative contents of heavy water and light water in the moderator.

3. In a nuclear reactor containing a moderator which is at least partly liquid, the temperature and the composition of which are each adapted to be varied substantially when the reactor is normally operating under power, said temperature being adapted to be varied within a band defined by upper and lower temperature limits, substantially apart from each other, a method of operating and controlling said reactor comprising operating the reactor in a plurality of operational stages during which the composition of the moderator is held substantially constant and the reactivity of the reacor is controlled by varying the temperature of the moderator within said band, and terminating each of said stages by varying the composition of the moderator to raise the temperature of the moderator and retain said temperature within said band.

4. A method in accordance with claim 3 wherein the reactor is operated continuously from one of said stages to the next.

5. A method in accordance with claim 3 wherein the moderator comprises a mixture of heavy water and light water and each of said stages is terminated by increasing the relative content of light water in said mixture.

6. In a nuclear reactor having a reactor vessel containing liquid moderator and coolant and distinct moderator and coolant circuits within said vessel for circulation of moderator and coolant, respectively, the temperature and composition of said moderator being adapted to be varied substantially when the reactor is normally operating under power, said temperature being adapted to be varied within a band defined by upper and lower temperature limits, substantially apart from each other, the improvement which comprises: temperature varying means operative during normal operation of said reactor and connected with said moderator circuit for varying the temperature of said moderator substantially independently with respect to the temperature of said coolant, and to a substantial extent; and means connected with said moderator circuit for varying the composition of said moderator.

References Cited by the Examiner

UNITED STATES PATENTS

| 2,787,593 | 4/1957 | Metcalf | 204—154.2 |
| 2,967,809 | 1/1961 | Reed | 204—154.2 |
| 3,022,235 | 2/1962 | Brown et al. | 204—193.2 |
| 3,081,246 | 3/1963 | Edlund | 176—42 |

OTHER REFERENCES

Edlung et al.: Nucleonics, 16, No. 5, page 80.

Nucleonics, 16, No. 5, May 1958, page 81 is added to the record, page 80 having been cited in paper No. 5.

Schultz: "Control of Nuclear Reactors and Power Plants," 1955, pages 128–138, publ. by McGraw-Hill.

LEON D. ROSDOL, *Primary Examiner.*

REUBEN EPSTEIN, CARL D. QUARFORTH,
*Examiners.*

P. G. BETHERS, M. R. DINNIN, *Assistant Examiners.*